United States Patent
Potyrailo et al.

(10) Patent No.: US 7,508,499 B2
(45) Date of Patent: Mar. 24, 2009

(54) METHODS FOR APPLICATION OF A TAG ONTO A MEDIA ARTICLE

(75) Inventors: Radislav Alexandrovich Potyrailo, Niskayuna, NY (US); Marc Brian Wisnudel, Clifton Park, NY (US); Steven F. Hubbard, West Sand Lake, NY (US)

(73) Assignee: General Electric Company, Schenectady, NY (US)

( * ) Notice: Subject to any disclaimer, the term of this patent is extended or adjusted under 35 U.S.C. 154(b) by 802 days.

(21) Appl. No.: 11/070,772

(22) Filed: Mar. 2, 2005

(65) Prior Publication Data

US 2005/0167510 A1 Aug. 4, 2005

Related U.S. Application Data

(63) Continuation of application No. 10/317,772, filed on Dec. 12, 2002, now abandoned.

(51) Int. Cl.
 *G01T 1/36* (2006.01)
(52) U.S. Cl. .......................................... 356/71; 378/45
(58) Field of Classification Search ............... 356/71
 See application file for complete search history.

(56) References Cited

U.S. PATENT DOCUMENTS

| | | | |
|---|---|---|---|
| 4,238,524 A | 12/1980 | LaLiberte et al. | |
| 4,774,315 A | 9/1988 | Miller | |
| 5,005,873 A | 4/1991 | West | |
| 5,028,690 A | 7/1991 | Galucci | |
| 5,043,203 A | 8/1991 | Fyvie et al. | |
| 5,201,921 A | 4/1993 | Luttermann et al. | |
| 5,329,127 A | 7/1994 | Becker et al. | |
| 5,580,410 A | 12/1996 | Johnston | |
| 5,664,017 A | 9/1997 | Gressel et al. | |
| 5,668,202 A | 9/1997 | Hirata et al. | |
| 5,703,229 A | 12/1997 | Krutak et al. | |
| 5,776,713 A | 7/1998 | Garner et al. | |
| 6,099,930 A | 8/2000 | Cyr et al. | |
| 6,470,093 B2 | 10/2002 | Liang | |
| 2002/0094058 A1* | 7/2002 | Kaiser et al. | 378/45 |
| 2008/0108516 A1* | 5/2008 | Saraf | 506/33 |

FOREIGN PATENT DOCUMENTS

GB 2264558 A 1/1993
WO PCT/EP02/10816 * 9/2002

OTHER PUBLICATIONS

Sriramakrishna Maruvada et al.; "Authenticatable Article and Method of Authenticating"; U.S. Appl. No. 10/889,913, filed Jul. 13, 2004; 27 pages.
David B. Engel et al.; "Marked Article and Method of Making the Same"; U.S. Appl. No. 10/952,653, filed Sep. 29, 2004; 46 pages.

* cited by examiner

*Primary Examiner*—L. G Lauchman
*Assistant Examiner*—Rebecca C Slomski
(74) *Attorney, Agent, or Firm*—General Electric Global Patent Operation

(57) ABSTRACT

A method for imparting tags to a media article, comprising: modifying predetermined locations on the article to change a surface energy of the predetermined locations, applying the tags to a surface of the article, and retaining the tags in the modified predetermined locations while the tags are removed from unmodified regions.

26 Claims, 7 Drawing Sheets

METHODS FOR APPLICATION OF A TAG ONTO A MEDIA ARTICLE

CROSS REFERENCE TO RELATED APPLICATIONS

This application is a continuation of U.S. application Ser. No. 10/317,772 filed on Dec. 12, 2002 now abandoned, which is herein incorporated by reference.

BACKGROUND OF THE INVENTION

1. Field of the Invention

The present invention relates generally to marking for identification purposes. More particularly, the present invention relates to systems and methods for the tagging of articles with tags in predetermined locations.

2. Description of the Related Art

The tagging of plastic articles is very desirable for a variety of applications, including piracy protection of optical storage media. Optical storage media are in widespread use today. Optical storage media may be used to hold music, data and software, and have become the standard medium for distributing large quantities of information in a reliable package. The number of illegal CD and DVD copies throughout the world has increased as a result of the computer age. One reason for this trend is that home PCs, blank CD-Rs, blank DVD-Rs, and fast CD and DVD burners have become cheaper and more widely available, so virtually anyone can setup a small disk manufacturing plant. Music and software piracy problems affect every sector of their industries. Retailers, distributors, artists, composers, publishers, and record companies are all affected when customers are sold a pirated copy rather than a legitimate recording. Hundreds of millions of counterfeit CDs and DVDs are thought to be created each year, and hundreds of millions of CD-Rs and DVD-Rs are sold every year.

The use of tags for identification in plastic materials is known in the art. UV and near-IR fluorescent dyes have been added to polymers for identification purposes. In one conventional approach, a near infrared fluorophore is incorporated into a polycarbonate substrate. One disadvantage of these conventional methods is that incorrect signals may be produced if any of the dyes age or leach under normal use conditions, which may include exposure to UV light, high ambient temperatures, etc. In addition, additives in polymers may alter the ratio of fluorescence intensities.

For the tagging of optical media, it would be advantageous to apply a tag onto a well-defined location, or locations, on an article rather than on a whole surface. In addition, it would be advantageous to apply such a tag onto an article while it is undergoing a spin-coating process, which is the commonly-used method for applying coatings to optical media due to the quality of the resulting coating, high speed and low manufacturing cost of the process.

BRIEF SUMMARY OF THE INVENTION

Disclosed herein are methods for imparting tags to a media article and articles made therefrom. In one embodiment, the method for imparting tags to a media article can comprise: modifying predetermined locations on the article to change a surface energy of the predetermined locations, applying the tags to a surface of the article, and retaining the tags in the modified predetermined locations while the tags are removed from unmodified regions. In another embodiment, the method for tagging a media article can comprise: modifying predetermined locations on the surface of a coating of the article using a radiation source; dissolving a dye in an appropriate solvent to form a solution; applying the solution to a surface of the article; retaining the dye on the modified predetermined locations on the surface to form tags; removing the dye from unmodified locations on the surface.

In yet another embodiment, a method for imparting tags to a media article can comprise: modifying predetermined locations on a surface of the article to change a surface energy of the predetermined locations; applying the tags to the surface; and retaining the tags in the modified predetermined locations while the tags are removed from unmodified regions.

In still another embodiment, the method for imparting tags to a media article can comprise: modifying predetermined locations on a surface of the optical article to change a surface energy of the predetermined locations; applying the tags to the whole surface of the optical article in a uniform thin film; and retaining the tags in unmodified locations while the tags are removed from the modified predetermined locations.

In one embodiment, the media article can comprise: a tag produced by the process comprising dissolving a dye in an appropriate solvent to form a solution, modifying a predetermined location on the surface of the article to change a surface energy of the predetermined location, applying the solution to the whole surface of the article, subjecting the article to a spinning motion that produces centrifugal forces, and retaining the dye on the modified predetermined location while the dye is removed from unmodified locations of the surface of the article by the centrifugal forces.

BRIEF DESCRIPTION OF THE DRAWINGS

A variety of specific embodiments of this invention will now be illustrated with reference to the Figures. In these Figures, like elements have been given like numerals.

DETAILED DESCRIPTION OF THE INVENTION

Figure 1:
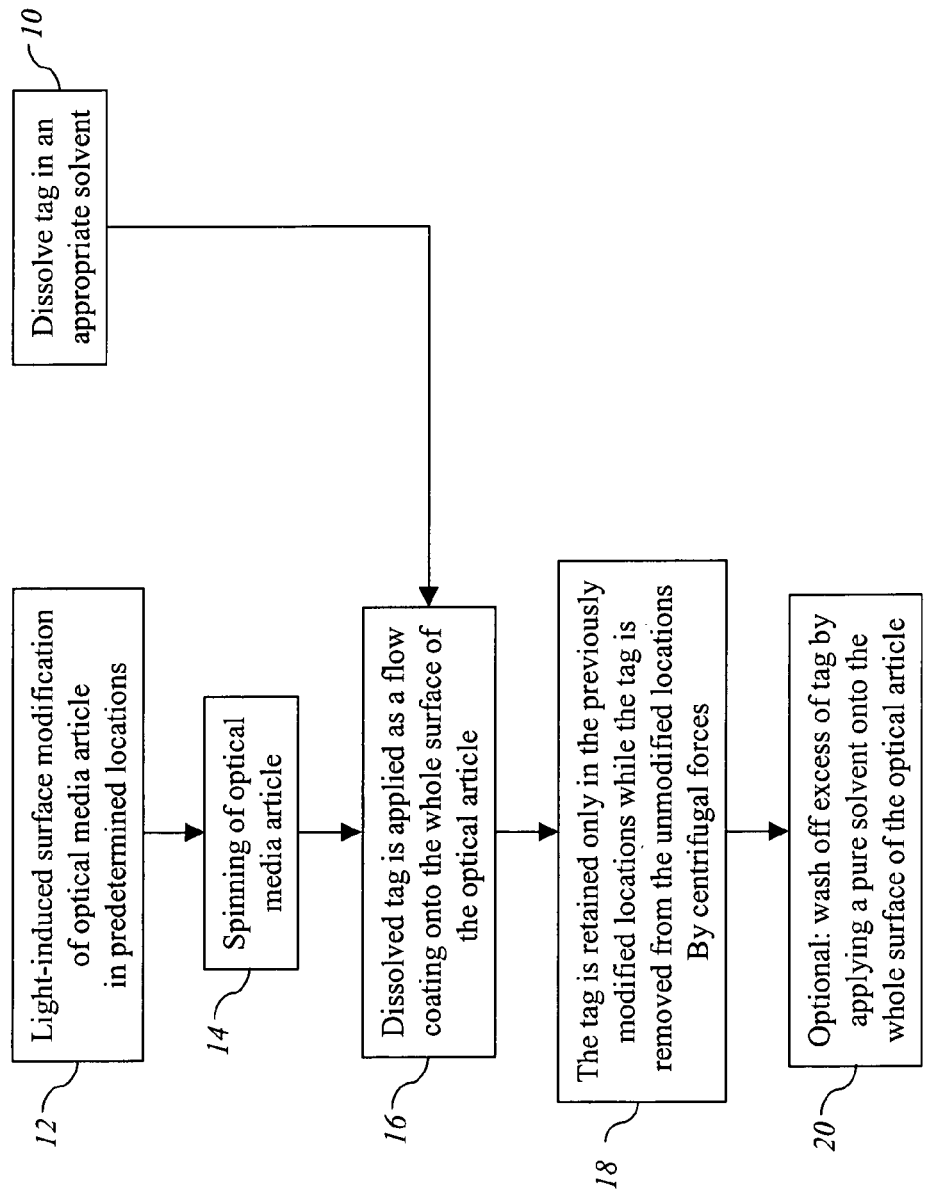
FIG. 1 is a functional block diagram illustrating the main steps for the application of a tag onto a spinning optical media article in accordance with an exemplary embodiment of the present invention.

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Throughout the drawings, like elements are given like numerals. The methods described below apply to the tagging of optical media articles, however, in principle also apply to the tagging of plastic articles for a variety of applications.

In various embodiments of the present invention, methods are described for applying a tag on a predetermined well-controlled location of an optical media article. Examples of optical media articles include, but are not limited to CDs, CD-Rs, CD-RWs, DVDs, DVD-Rs, DVD-RWs, Blu-ray as well as any other optical storage media known in the art. The application of a tag onto an optical article serves different purposes. These purposes include, but are not limited to, antipiracy protection, identification, labeling, decorative applications and any other application typically used for optical media articles.

In one embodiment, a spectroscopic tag is incorporated onto an optical media article during the article production process. Spectroscopic tags are materials that possess several properties advantageous for polymer and polymer article identification. These tags are compounds that exhibit colorimetric, photorefractive, photochromic, thermochromic, fluorescent, elastic scattering, inelastic scattering, and any other optical property useful for incorporation into optical media articles. For an application of a spectroscopic tag, the surface of the article is modified to change its surface energy. Upon the changing of the surface energy in a predetermined well-defined location, an applied tag dissolved in an appropriate solvent is attracted to the pretreated region. The materials of the optical article may be selected and/or modified to provide the required properties for the retention of the tag on the surface of the article. These modifications may include, but are not limited to, different copolymer materials, additives, endcapping, and/or any other modifications known in the art.

In another embodiment, a spectroscopic tag dissolved in an appropriate solvent is applied to the whole surface of the optical media article. In some applications, it may not be necessary to dissolve the tag in a solvent. When the optical article is subjected to centrifugal forces, the tag is retained in the previously modified region and removed from unmodified regions by the centrifugal forces. In one embodiment, a readout of the tag may be performed using lasers employed in conventional readers of optical media articles. In another embodiment, a readout of the tag may be performed outside of the optical disc drive.

In a further embodiment, the present invention presents an optical article comprising an identification mark produced by the process comprising the steps of dissolving a dye in an appropriate solvent to form a solution, modifying a predetermined location on the surface of the optical article to change the surface energy of the predetermined location, applying the solution to the whole surface of the optical article, subjecting the optical article to a spinning motion that produces centrifugal forces, and retaining the dye on the modified predetermined location while the dye is removed from unmodified locations of the surface of the optical article by the centrifugal forces.

In a still further embodiment, materials of the spectroscopic tags include organic and inorganic dyes and pigments, nanocrystals, nanoparticles, quantum dots, organic fluorophores, inorganic fluorophores, and any other dyes known in the art and combinations comprising at least one of these tags. In still further embodiments, the materials range in size from about 1 nanometer to about 10 micrometers and may be incorporated into a solution in dissolved or dispersed form. The excitation wavelengths of these dyes and pigments may or may not be in the range of operation of laser diodes used in optical media players and recorders, and wherein a readout of the tag is performed by the laser of the optical media article drive (i.e., player and/or recorder) or by a source outside of the disc drive.

The methods of the present invention are described below with reference to a compact disc (CD), however, the methods may be practiced with any optical article, such as a CD-R, CD-RW, DVD, DVD-R, DVD-RW, Blu-ray or the like. To practice the methods of the present invention, a substrate is initially provided. The substrate may be of any type and should be encoded with information beforehand in the form of pits and/or a continuous groove on at least one side. Typically, a CD is an injection-molded piece of clear polycarbonate plastic. During manufacturing, the plastic is impressed with microscopic bumps arranged as a single, continuous, extremely long spiral track of data. The spiral track of data circles from the inside of the disk to the outside. When the clear polycarbonate is formed, a thin, reflective layer (typically aluminum, silver or gold) is sputtered onto the disc, covering the microscopic bumps. A thin layer of acrylic is then sprayed over the reflective layer to protect it and provide a surface for labeling. Pits are often referred to when discussing CDs instead of bumps. Pits appear on the reflective side, bumps appear on the side the laser reads from. An optical media player performs the task of finding and reading the data stored as bumps on the optical media article.

The materials for the optical article substrate are not critical in type, and should preferably have a high light-transmittance. Examples of the material include, but are not limited to, thermoplastic resins such as polycarbonates, polymethyl methacrylate and the like, and thermosetting resins such as epoxy resins, and the like. Of these, light-transmitting thermoplastic resins such as polycarbonates are preferred. Materials of the optical article can be selected and/or modified to provide required properties for the retention of the dissolved dye on the surface. These modifications can include, but are not limited to, different copolymer materials, additives, endcapping, and/or any other modification known in the art.

Upon polymerization of a polymer, a growing polymer chain has a reactive group at its end that is available for the continued growth of the polymer chain. When an alternative reaction occurs (which results in the incorporation of a moiety without this reactive group), the ability of the chain to continue the chain extension is terminated. Chains with terminal groups of this type are said to be endcapped. For example, optical articles are typically made from polycarbonate when diphenyl carbonate reacts with bisphenol A, it produces a growing polymer having a reactive hydroxyl group which is available for the continued growth of the polymer chain. When an alternative reaction occurs (which results in the incorporation of a moiety without this reactive hydroxyl group), the ability of the chain to continue the chain extension is terminated. A variety of endcapping reagents have been disclosed in the art, including those described in U.S. Pat. Nos. 4,774,315, 5,028,690, 5,043,203, 5,644,017 and 5,668, 202.

Optionally, polycarbonate optical articles can be made through a polycondensation process involving bisphenol monomers with phosgene or diphenyl carbonate and an optional monomer selected to alter the surface energy of the optionally treated and untreated optical article. Examples of surface energy modifying comonomers or additives include endcapping monomers such as monofunctional phenols, branching agents that result in increased endgroup formation, siloxane-containg monomers and additives, antistatic agents, antifogging agents, surface-segregating additives and other additives.

In various embodiments, methods are provided for applying spectroscopic tags onto predetermined locations on the surface of an optical article, such as a CD. Spectroscopic tags are materials that possess properties advantageous for polymer and polymer article identification. Initially, a tag material is dissolved or dispersed in an appropriate liquid solvent (Block 10) to provide a thin tagging layer in the form of a solution or dispersion, which will later be applied using a spin-coating technique. In an alternative embodiment, it may not be necessary to dissolve the tag in an appropriate solvent. The liquid solvent used to dissolve the tag material may be any liquid that is able to dissolve or disperse a dye without being corrosive to the surface of the optical article. Preferably, solvents include water, methanol, ethanol, isopropanol and methoxypropanol. These solvents may be used on their own or in combination.

In an alternative embodiment, when the dye is not of a compound capable of being dissolved in a liquid medium, the dye may be used in combination with a binder resin. The binder resin used should be of a low concentration so as to not adversely affect the thickness of the article and the optical properties of the article. The binder resin may be dissolved in a solvent and the insoluble dye may bind to the binder resin and become dispersed in the liquid medium. The type of binder resins used are not critical. Preferably, thermoplastic polymers may be used including, for example, resins such as polystyrene, poly(.alpha.-methylstyrene), polyindene, poly(4-methyl-1-pentene), polyvinylpyridine, polyvinylformal, polyvinylacetal, polyvinylbutyral, polyvinyl acetate, polyvinyl alcohol, polyvinyl chloride, polyvinylidene chloride, polyvinyl methyl ether, polyvinyl ethyl ether, polyvinyl benzyl ether, polyvinyl methyl ketone, poly(N-vinylcarbzole), poly(N-vinylpyrrolidone), polymethyl acrylate, polyethyl acrylate, polyacrylic acid, polyacrylonitrile, polymethyl methacrylate, polyethyl methacrylate, polybutyl methacrylate, polybenzyl methacrylate, polycyclohexyl methacrylate, polymethacrylic acid, polyamide methacrylate, polymethacrylonitrile, polyacetaldehyde, polychloral, polyethylene oxide, polypropylene oxide, polyethylene terephthalate, polybutylene terephthalate, polycarbonates of bisphenols and carbonic acids, poly(diethylene glycol/bis-allylcarbonates), 6-nylon, 6,6-nylon, 12-nylon, 6,12-nylon, polyethyl asparatate, polyethyl glutamate, polylysine, polyproline, poly(.gamma.-benzyl-L-glutamate), methyl cellulose, hydroxypropyl cellulose, acetyl cellulose, cellulose triacetate, cellulose tributylate, polyurethane resins and the like, organopolysiloxanes such as poly(phenylmethylsilane), organopolygermanium compounds, and copolymers or co-polycondensates of monomeric constituents in the above-mentioned polymers or resins.

Still referring to FIG. 1, prior to coating the optical article with the dye containing solution, predetermined well-controlled locations on the surface of the optical are prepared for accepting and retaining the dye. A predetermined well-controlled location (site-specific) or locations on the optical media is defined as a localized area that is, was, or is intended to be used for the deposition of a tag that may be used for identification purposes. In an alternative embodiment, the predetermined locations may be chemically modified, such as by spraying with silicone, for example, in order to prevent the predetermined locations from retaining the dye. The predetermined location(s) may have any convenient shape, e.g., linear, circular, rectangular, elliptical, etc. The surface area, number of tags and locations of the predetermined regions may depend on the particular application.

The surface energy of the predetermined locations is modified using ultraviolet (UV) light (Block 11), such as from a mercury lamp, or by chemical modification. The predetermined locations may be exposed through a mask, which is described in detail below. Upon changing the surface energy in well-defined locations, the applied tag dissolved in the solvent preferentially is attracted to or repelled from the pretreated regions. The surface modification is produced by the oxidation of the surface with high-energy photons produced by the UV light source. Other types of surface modification known in the art may also be employed. Additional light sources may also be used for this purpose. A partial list is given in Table 1.

TABLE 1

Light sources for applications in deposition of tags onto optical media articles.

| Source | Spectral range of emission (nm) |
|---|---|
| Continuous wave sources: | |
| Xenon arc lamp | 200-1000 |
| Mercury arc lamp | 250-600 |
| Deuterium lamp | 180-420 |
| Tungsten lamp | 320-2500 |
| Light emitting diodes | different diodes cover range from 370 to 1500 nm |
| Diode lasers | different diode lasers cover range from about 400 to 1500 nm |
| Argon ion laser | several lines over 350-514 nm |
| Pulsed sources: | |
| Nitrogen laser | 337 nm |
| Nd:YAG laser | frequency tripled - 355; frequency quadrupled - 266 |
| Dye lasers | frequency doubled 200-450 |

Generally, physical masking systems may be employed in combination with various dye deposition techniques in order to modify unmasked regions of the surface of the optical article. The mask comprises one or more holes disposed therethrough or openings disposed therein. Each of the one or more holes or openings may be, for example, substantially circular, oblong, square, rectangular, triangular or a more complex shape. The mask is disposed adjacent to a surface of the optical article such that light passing through each of the plurality of holes is selectively prevented or shielded from contacting predetermined locations of the surface of the optical article. A shutter may be disposed above the mask. The shutter is a mechanical device that selectively allows/prevents light from contacting the surface of the optical article by opening/closing. In one example, a mask having openings ranging from about 1 mm to about 10 mm may be applied onto the surface of the optical article. UV light may then be applied through the mask to change the surface energy and modify unmasked regions of the article. The modified regions may differ in thickness and shape across the surface of the article. Typically, the mask comprises a plate, sheet, film, coating or the like. The mask may not be a necessary component of the system depending upon the particular application.

Figure 2:
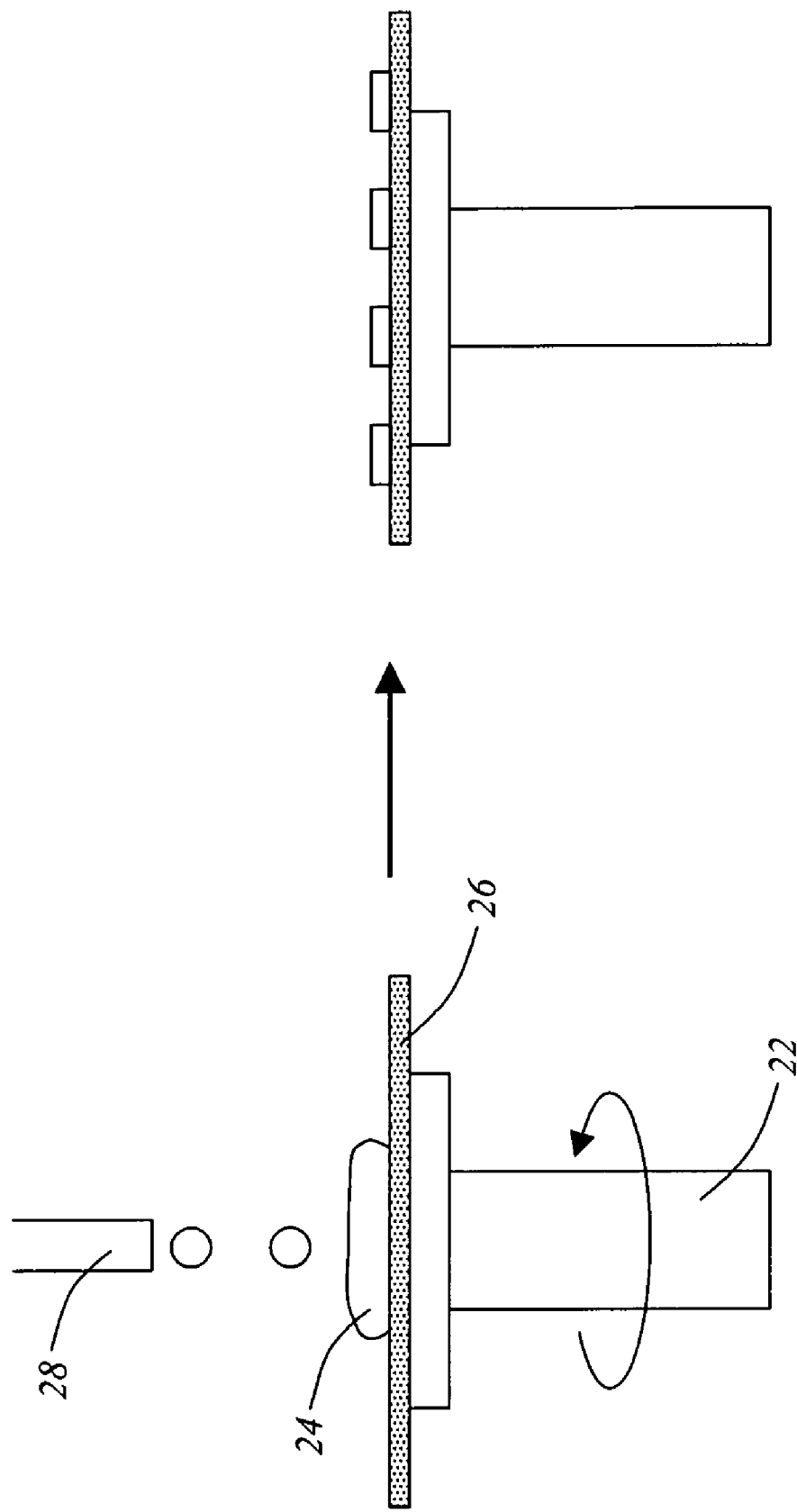
FIG. 2 is a schematic diagram illustrating spin-coating apparatus affects on a deposited material in accordance with an exemplary embodiment of the present invention.

Once the surface of the optical article has been pretreated and the tag has been dissolved in the appropriate solvent, the solution or dispersion is applied to the whole surface of the article. In the practice of the invention, the solution is applied onto the article while the article is undergoing spinning, another type of motion, or no motion (Block 12). Spin-coating is a commonly-used method for applying coatings to optical articles due to the quality of the resulting coating, high speed and low manufacturing costs of the process. Referring to FIG. 2, spin-coating involves the acceleration by a rotating member 22 of the solution material 24 (deposited material) on the rotating substrate 26. The solution material 24 is deposited in the center of the substrate either manually or using a computer controlled apparatus and delivery device 28. Referring again to FIG. 1, the solution may be applied as a flow coating onto the whole surface of the optical article. In alternative embodiments, vapor deposition or solvent casting might be an appropriate method. The physics behind spin-coating involve a balance between centrifugal forces controlled by spin speed and viscous forces that are determined by solvent viscosity. Spin-coating techniques may be controlled by varying solution viscosity, solid content, angular speed and spin time.

Still referring to FIG. 1, the centrifugal forces resulting from the spin-coating process pull the solution from the center of the article towards the outer edge of the article. The dye is attracted to the pretreated locations and retained in those locations, while the dye is not attracted to untreated locations and is removed from those locations (Block 18). In an optional step (Block 20), excess dye may be washed off the surface of the article by applying a pure solvent onto the whole surface of the article.

The complete tagging process may be manually or automatically controlled. For example, one or more dissolved dye solutions may be drawn from a sample library manually with a syringe-type instrument and manually delivered to the surface of the optical article. In an automatic system, some function of the system is performed automatically, such as sample selection or delivery. Solvent concentrations may be programmed to increase, hold steady, go down or any other function. Preferably, in order to rapidly and accurately select samples and proper measurements, the samples are drawn from their respective containers and delivered in a fully automated manner, such as with an auto-sampler. A microprocessor of the auto-sampler may be programmed to direct the auto-sampler to withdraw a sample from a sample vial into the delivery device 28, and then direct the device. In one embodiment, the auto-sampler may be programmed to automatically sample one solution and then another, depending upon the desired tag. Preferably, the microprocessor of the auto-sampler comprises a user-interface that may be programmed to allow for various sampling protocols. The auto-sampler may also be controlled manually.

Preferably, the delivery device 28 is movable relative to the surface of the optical article, either via movement of the delivery device 28 or via movement of the optical article, such as through the use of a programmable x, y, z stage or the like. A continuous flow coating may be created by applying different feed rates to 2 or more dye containing solutions and simultaneously moving the target in the x, y or z directions. In one embodiment, a dye may be applied to one pretreated area, spin-coating and then dried. Then, another area of the surface may be treated and the spin-coating process repeated using a second different dye solution. This process may be repeated any number of times depending on the desired application.

The materials of the spectroscopic tags may include any dyes known in the art. These include organic and inorganic dyes and pigments, nanocrystals and nanoparticles, quantum dots, and any other types of materials having a size in the range from about 1 nanometer (nm) to about 10 micrometers that can be incorporated into a solution in dissolved or dispersed form. Examples of spectroscopic tags include organic and inorganic compounds.

Examples of the organic compounds include organic dyes, organic fluorophores, fluorescent dyes, IR absorbing dyes, UV absorbing dyes, photochromic dyes, thermochromic dyes, and other known dyes that may be used for this purpose. Specific examples of dyes include xanthene dyes such as rhodamine B, rhodamine 6G, eosine, phloxine B and the like, acridine dyes such as acridine orange, acridine red and the like, azo dyes such as ethyl red, methyl red and the like, porphyrin dyes, phthalocyanine dyes, cyanine dyes such as 3,3'-diethylthiacarbocyanine iodide, 3,3'-diethyloxadicarbocyanine iodide and the like, merocyanine dyes, styryl dyes, oxonol dyes, triarylmethane dyes, methylene blue, phenol blue and the like. These dyes may be used singly or in combination depending on the desired application. This wide range of content of the organic compound depends on the type of organic compound and the purpose. For instance, fluorescent dyes may be added to a resin binder on the order of ppm as is known in the art.

The tags bond to specific predetermined locations and fluoresce when excited by a specific optical wavelength. Appropriate wavelengths range from about 640 nm to about 1100 nm. Nonlimiting examples of these materials are presented in Table 2.

TABLE 2

Materials for fluorescent tagging of spinning optical media articles.

| Tagging material | Excitation wavelength (nm) | Emission wavelength (nm) |
|---|---|---|
| Tris(di(4-bromo)-benzoylmethane)-mono(phenanthroline)europium (III) | ~400 | ~615 |
| Tris(dibiphenoylmethane)-mono(phenanthroline)europium (III) | ~410 | ~615 |
| Tris(2-phenylpyridine)iridium (III) | ~400 | ~515 |
| Cresyl violet | ~600 | ~630 |
| Nile blue | ~633 | ~675 |
| Oxazine 1 | ~645 | ~670 |
| Oxazine 4 | ~615 | ~660 |
| Rhodamine 700 | ~645 | ~700 |
| DDI | ~710 | ~745 |
| IR125 | ~795 | ~840 |
| DTTCI | ~760 | ~815 |
| HDITCI | ~780 | ~825 |
| CdSe nanoparticles, crystal diameter = 2.8 nm | ~520 | ~535 |
| CdSe nanoparticles, crystal diameter = 3.4 nm | ~545 | ~560 |
| CdSe nanoparticles, crystal diameter = 4.0 nm | ~575 | ~585 |
| CdSe nanoparticles, crystal diameter = 4.7 nm | ~595 | ~610 |
| CdSe nanoparticles, crystal diameter = 5.6 nm | ~625 | ~640 |

Other non-fluorescing tags that bond to specific predetermined locations are possible. Nonlimiting examples of these materials and appropriate wavelengths for detection are presented in Table 3.

TABLE 3

Materials for non-fluorescent tagging of spinning optical media articles.

| Tagging material | Absorption wavelength (nm) |
|---|---|
| Photochromic quinones | 400-800 |
| Photochromic viologens | 400-800 |
| Spirooxazines | 400-750 |
| Spiropyrans | 400-750 |

The following examples illustrate other types of tags and are not meant to limit the scope of the invention. These include thermochromic compounds. Examples of thermochromic compounds include several dyes available from Matsui-color. They also include IR absorbing compounds such as phthalocyanine dyes, cobalt or platinum complexes/chelates, some VAT dyes such as anthraquinone and methylene blue, nigrosine compounds such as Keystone Black R or Anirox, and conjugated polymers/oligomers especially in the doped form (polyaniline, polyphenylenes, polythiophenes, polypyrroles and their derivatives). Examples of other heat-absorbing compounds include microencapsulated sprayable liquid crystals. They are available, for example, from Liquid Crystal Resources, Inc., with a wide range of transition temperatures. An example of a room temperature liquid crystal is SPC/R25C5W from Liquid Crystal Resources, Inc. Examples of temperature sensitive scattering compounds include salts in a matrix just above the critical concentration at room temperature, polymer blends that are below the lower critical solution temperature (LCST) at room temperature. Examples of materials with refractive index changes include liquid crystal polymers, polymers developed for holographic data storage where their refractive index or birefringence changes when temperature increases. Examples of materials with dimensional stability changes such as those with high thermal expansion coefficient.

The excitation wavelengths of the fluorophores are in the range of operation of a variety of available light sources and of laser diodes used in conventional readers/recorders of optical media. In one embodiment, a readout of the spectroscopic tags may be performed using the laser diodes. In an alternative embodiment, the reading of the tags is done outside of the optical disc drive. Although one embodiment of an optical media reader is discussed below, it is to be understood that the methods of the present invention may be employed using any optical media reader known in the art. Conventional optical readers contain optical read/write pick-up mechanisms attached to a tracking mechanism. Typically, both the optical read/write head and the tracking mechanism are positioned adjacent to the surface of a spinning optical storage medium during operation. This configuration is illustrated in FIG. 3.

Figure 3:
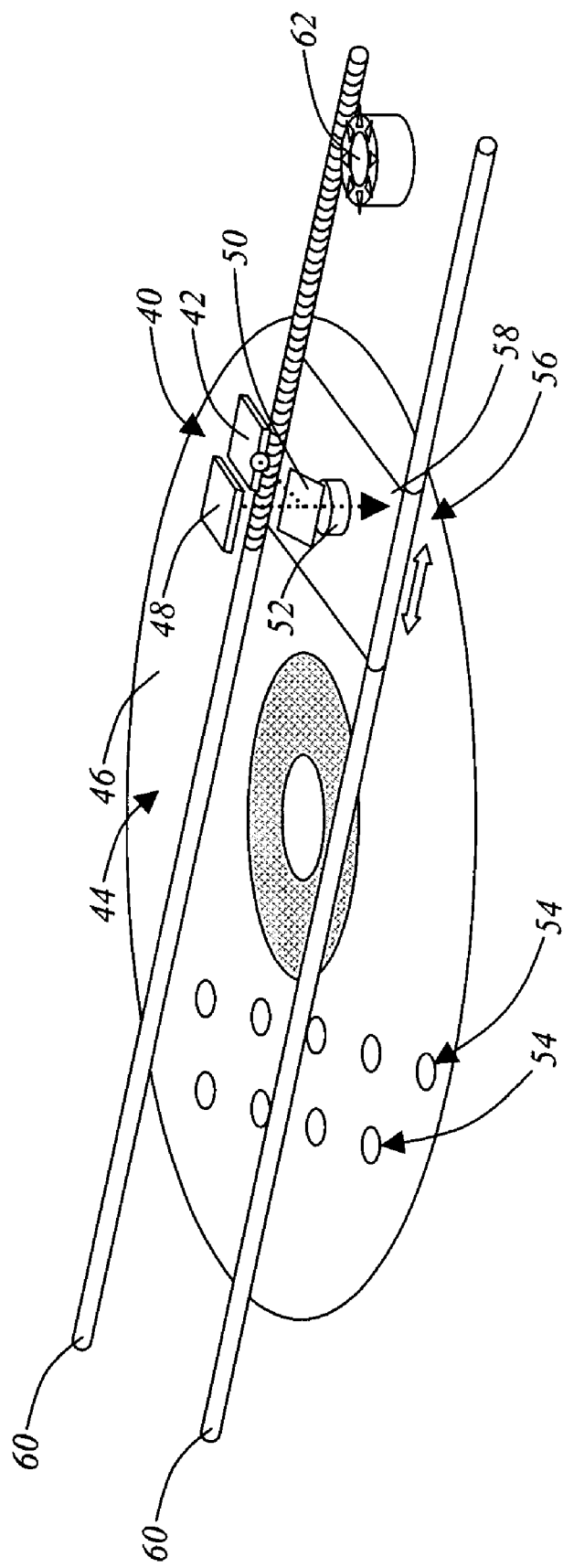
FIG. 3 is a schematic diagram illustrating an optical media and optical media reader example in accordance with an exemplary embodiment of the present invention.

Referring to FIG. 3, the optical read/write head 40 includes a light source 42, such as a laser diode or the like, operable for transmitting encoded/un-encoded light, such as laser light or the like, to the surface 44 of the optical storage medium 46. The optical read/write head 40 also includes a light receiving device 48, such as a photodiode or the like, operable for receiving encoded/un-encoded light, such as laser light or the like, from the surface 44 of the optical storage medium 46. A reflective element 50, such as a semi-reflective mirror, a beam splitter, or the like, and a focusing lens 52 or other focusing optics may also be used to transmit the light to and/or receive the light from the surface 44 of the optical storage medium 46.

Using the optical read/write head 40, spectroscopic tags 54 and data are read from predetermined portions of the surface 44 of the optical storage medium 46 via the selective positioning of the tracking mechanism 56 and the optical read/write head 40. Typically, the tracking mechanism 56 includes a pick-up carrier assembly 58 movably attached to one or more guide rails 60, a portion of which may be threaded. In conjunction with a servo motor 62 or the like, the one or more guide rails 60 are operable for moving the tracking mechanism 56 and the optical read/write head 40 linearly with respect to the surface 44 of the optical storage medium 46.

Additional methods for tagging optical articles may include dissolving a dye in an appropriate solvent and coating the optical article with the dye-containing reagent solution by suitable coating methods such as spin-coating, dip-coating (immersion), transfer printing, silk-screening and the like. The dye is absorbed into or onto the pretreated regions and becomes trapped on the surface of the article. Optionally, the excess dye may be removed from the untreated regions by washing the surface of the article with a pure solvent.

Additional methods for tagging optical articles may include dissolving a dye in an appropriate solvent and coating the entire or partial surface of the optical article with the dye-containing reagent solution by suitable coating methods. Optionally, the some of the dye coating may be removed from regions of the surface by washing the surface of the article with a pure solvent.

The application of the tags onto optical media articles serve multiple purposes, such as identification, piracy protection, labeling, decorative applications, and any other application typically used for optical media articles.

EXAMPLE 1

Figure 4:
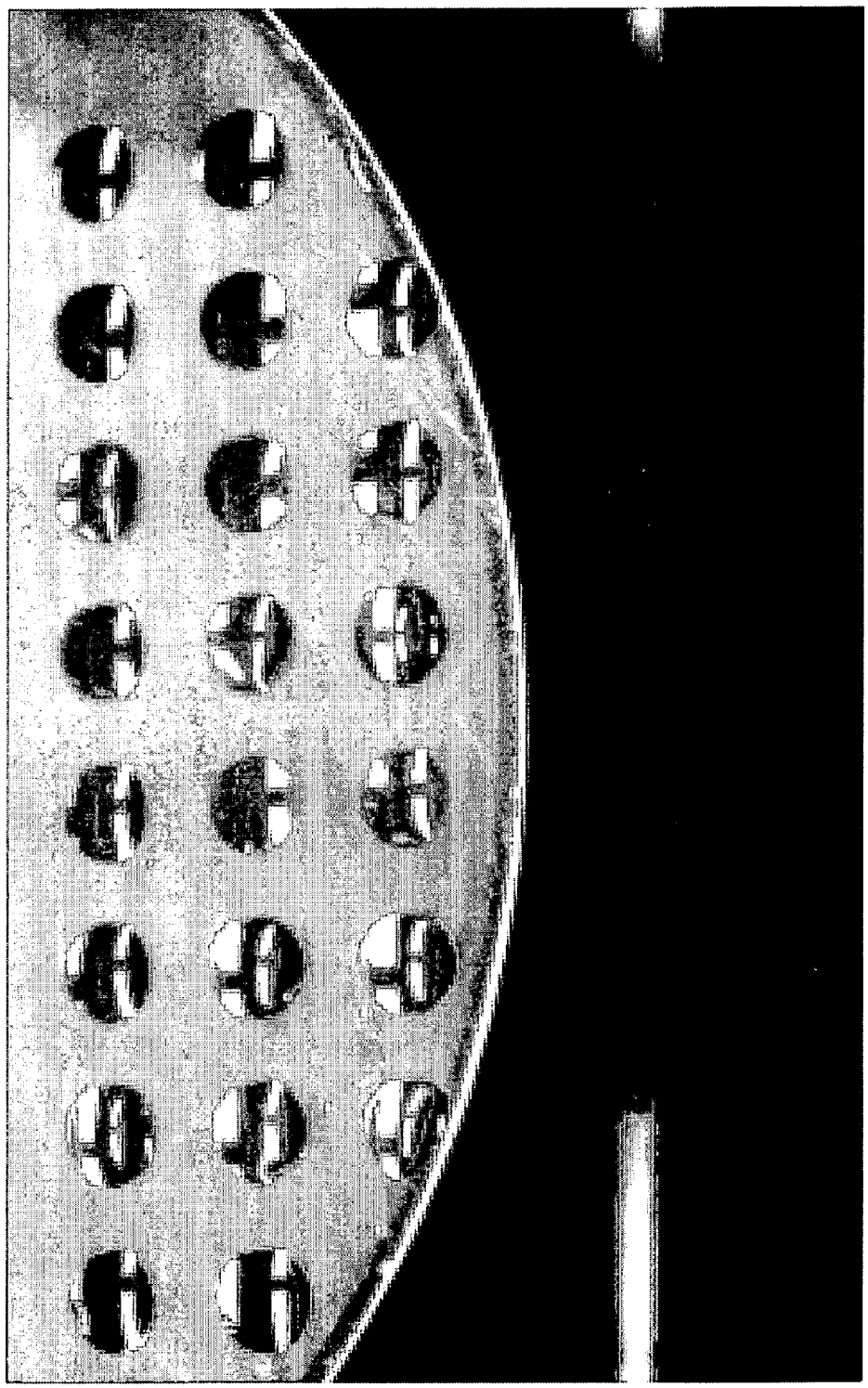
FIG. 4 is a perspective view of an optical media article (DVD) illustrating solvent retention on modified macro-regions in accordance with an exemplary embodiment of the present invention.
Figure 5:
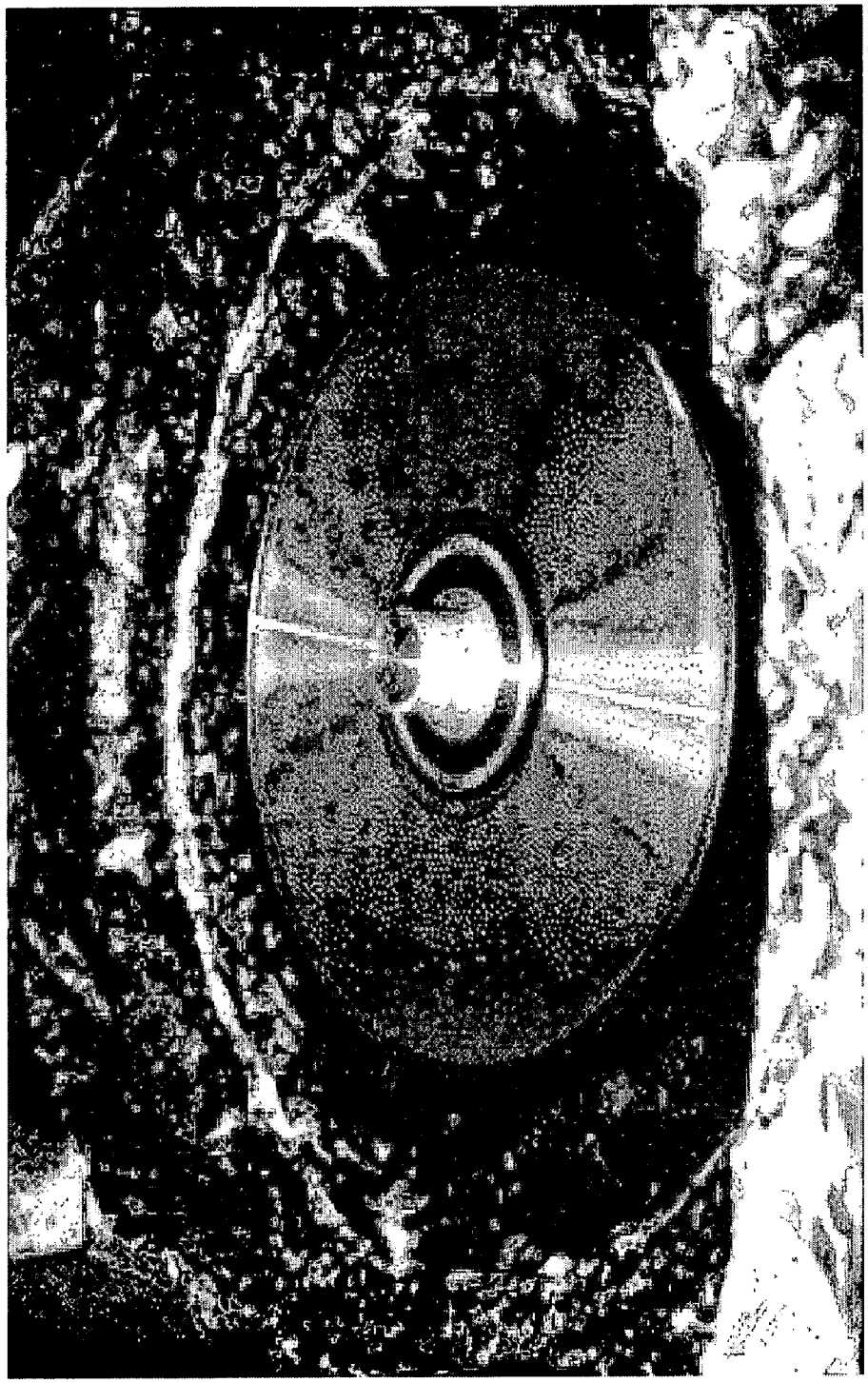
FIG. 5 is a perspective view of the optical media article of FIG. 3 illustrating the surface of the article immediately after dye deposition when the article was spinning in accordance with an exemplary embodiment of the present invention.
Figure 6:
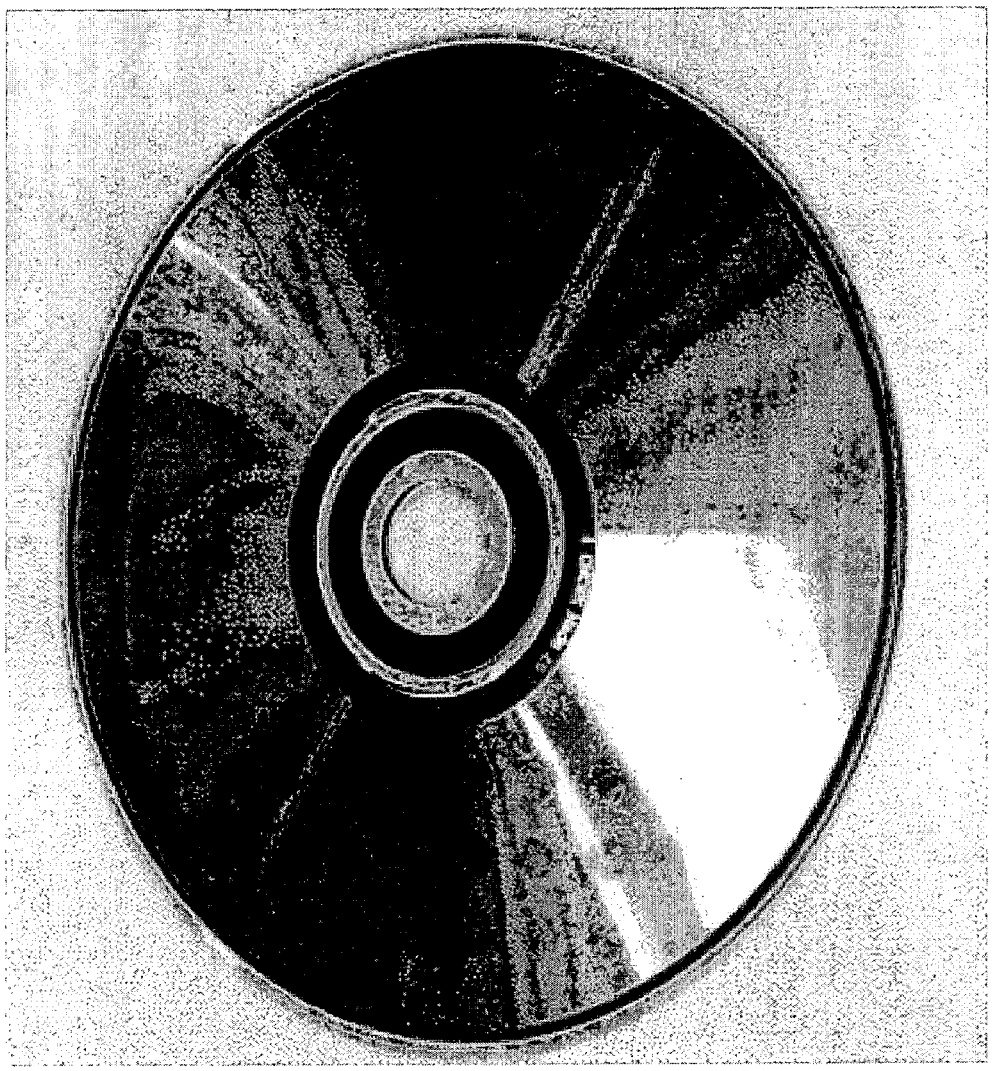
FIG. 6 is a perspective view of the optical media article of FIG. 4 illustrating the modified and dye-treated regions of the article retaining the dye after a wash step to remove excess dye in accordance with an exemplary embodiment of the present invention.
Figure 7:
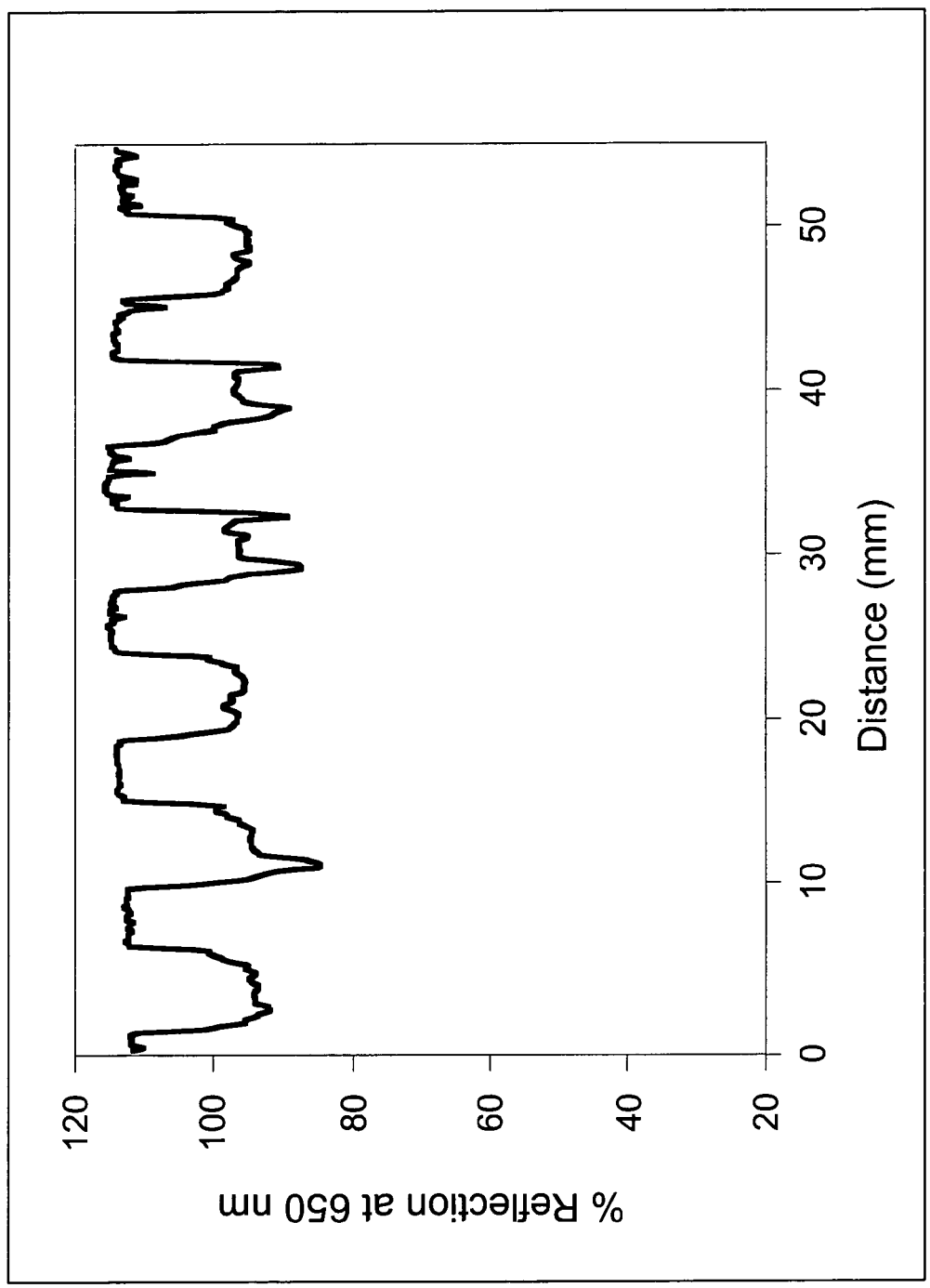
FIG. 7 is graphical illustration of the spatially resolved reflectivity change at 650 nm measured across 6 spots deposited onto a spinning optical media article.

A mask having about 5 mm openings was applied onto the surface of a digital versatile disc (DVD). Light was applied through the mask in order to modify the unmasked regions of the article. A low intensity handheld Hg lamp was used as the light source to modify the surface of the optical article. Upon the completion of the exposure, the mask was removed and water was poured onto the surface of the article having the modified regions. FIG. 4 illustrates the results of the test demonstrating the solvent retention on the predetermined modified macro-regions of the optical media article (DVD). An organic dye (methylene blue) was then dissolved in water and the solution was poured onto the spinning optical media article modified as describe above. The surface of the article immediately after dye deposition is illustrated in FIG. 5. The surface was then washed with the pure solvent to remove the excess of the dye. As is illustrated in FIG. 6, as a result of the centrifugal forces on the solution, the modified regions of the article retained the dye while the unmodified regions did not. FIG. 7 illustrates the spatially-resolved reflectivity change at 650 nm as measured across one of the spots deposited onto the spinning optical media article.

EXAMPLE 2A

Phthalocyanine metal complex (Sands SDS8303) was dissolved into Dowanol PM solvent at a concentration of 1.5 wt %. Approximately 3 ml of the solution was dispensed onto the surface of unmetalized polycarbonate CD substrates at about 20 mm from the center hole. The substrates were then spun at about 1000 rpm, spreading the solution over the surface of the CDs. The coatings were then allowed to dry overnight. The coated side of the substrates were then sputtered with aluminum to a thickness of about 40-60 nm using a Steag Unijet CD metalizer. The resulting CDs, with the phthalocyanine dye coating sandwiched between the polycarbonate substrate and aluminum reflective layer, had an absorbance at 650 nm of 0.37.

EXAMPLE 2B

Additional coated CDs were prepared as in Example 2A, except that the coating solution was dispensed at about 40 mm from the center hole. Then, following spin-coating of the dye solution, the disks were spun again while washing the substrate with Dowanol PM solvent from about 45 mm from the center hole to the edge of the disk. As a result of this washing procedure, only a ~5 mm band of dye coating remained on the surface of the disks.

EXAMPLE 2C

Additional coated CDs were prepared as in Example 2B, but aluminum was sputtered onto the dye-coated disks, resulting in the dye coating being sandwiched between the polycarbonate substrate and the reflective layer.

EXAMPLE 2D

Additional coated CDs were prepared as in Example 2A, but the coating solution comprised of 1.3 wt % Lambda chrome IR125 dye and 15 wt % poly(methyl methacrylate) in Dowanol PM. The resulting CDs, with the IR125 dye in a PMMA coating sandwiched between the polycarbonate substrate and aluminum reflective layer, had an absorbance at 780 nm of 0.54.

EXAMPLE 2E

Additional coated CDs were prepared as in Example 2D, but the coating solution comprised of 1.3 wt % rhodamine 800 dye and 15 wt % poly(methyl methacrylate) in Dowanol PM. The resulting CDs, with the rhodamine 800 dye in a PMMA coating sandwiched between the polycarbonate substrate and aluminum reflective layer, had an absorbance at 650 nm of 0.1.

A method for imparting tags to a media article comprising modifying predetermined locations on a surface of the article to change the surface energy of the predetermined locations, applying the tags to the surface, and retaining the tag in the modified predetermined locations while the tag is removed from unmodified regions. The method further comprising subjecting the article to a spinning motion that produces centrifugal forces and retaining the tags in modified predetermined location while the tags are removed from unmodified regions by the centrifugal forces.

A media article comprising an identification mark produced by the process comprising dissolving a dye in an appropriate solvent to form a solution, modifying a predetermined location on the surface of the article to change a surface energy of the predetermined location, applying the solution to the whole surface of the article, subjecting the article to a spinning motion that produces centrifugal forces, and retaining the dye on the modified predetermined location while the dye is removed from unmodified locations of the surface of the article by the centrifugal forces.

It is apparent that there have been provided, in accordance with the methods of the present invention, methods for the tagging of spinning optical media articles in predetermined well-controlled locations. Although the methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A method for tagging a media article, comprising:
modifying predetermined locations on the media article to change a surface energy of the predetermined locations;
applying a tag to the media article; and
retaining the tag in the modified predetermined locations while the tag is removed from unmodified regions.

2. The method of claim 1, wherein applying the tag comprises subjecting the media article to a spinning motion that produces centrifugal forces, and wherein the tag is removed from the unmodified regions by the centrifugal forces.

3. The method of claim 1, wherein the tag comprises spectroscopic tag.

4. The method of claim 3, wherein the spectroscopic tag is selected from the group consisting of: organic dyes, organic pigments, inorganic dyes, inorganic pigments, nanocrystals, nanoparticles, quantum dots, organic fluorophores, inorganic fluorophores, and combinations comprising at least one of these tags.

5. The method of claim 3, wherein excitation wavelengths of the spectroscopic tag is in a range of operation of a laser diode used in an optical media article drive, and wherein a readout of the tag is performed by the laser of the optical media article drive.

6. The method of claim 3, wherein excitation wavelengths of the spectroscopic tag is in a range of operation outside of the laser diode used in an optical media article player or recorder, and wherein a readout of the tag is performed outside of the optical media article player.

7. The method of claim 1, wherein the media article comprises an optically transparent substrate with the tag on a laser-incident surface of the substrate.

8. The method of claim 1, wherein the media article comprises an optically transparent substrate with the tag on a data layer adjacent to a reflective layer.

9. The method of claim 1, wherein a material of the article is selected and/or modified to provide required properties for the retention of the dissolved tag on the article.

10. The method of claim 9, wherein the modifications are selected from the group consisting of different copolymer materials, surface-segregating additives, endcapping, and combinations comprising at least one of the foregoing modifications.

11. The method of claim 1, wherein the modifying comprises using light-induced surface modification.

12. The method of claim 1, wherein removing the tag from the unmodified regions comprises washing off excess tag by applying a pure solvent onto the media article.

13. The method of claim 1, wherein the media article is an optical media article and wherein the tag does not interfere with optical properties of the optical media article.

14. The method of claim 1, wherein modifying predetermined locations comprises using a radiation source; and wherein applying the tag comprises dissolving a dye in an appropriate solvent to form a solution, and applying the solution to the media article.

15. The method of claim 14, further comprising applying the solution while the media article is undergoing a spinning motion, and wherein the dye is removed from the unmodified regions by centrifugal forces produced from the spinning motion.

16. The method of claim 14, wherein the dye is a fluorophore.

17. The method of claim 1, wherein the tag is a fluorescent material.

18. A method of claim 1, wherein modifying the predetermined locations comprises modifying predetermined locations on a surface of a coating of the media article.

19. The method of claim 1, wherein applying the tag and retaining the tag in the modified predetermined locations further comprises subjecting the article to a spinning motion that produces centrifugal forces.

20. The method of claim 19, wherein modifying the predetermined locations comprises using light-induced surface modification.

21. A method for tagging a media article, comprising:
   modifying predetermined locations on the media article to change a surface energy of the predetermined locations;
   applying a tag to the media article; and
   retaining the tag in unmodified regions while the tag is removed from the modified predetermined locations.

22. The method of claim 21, wherein applying the tag comprises subjecting the article to a spinning motion that produces centrifugal forces.

23. The method of claim 21, wherein the tag comprises a spectroscopic tag.

24. The method of claim 21, wherein the media article comprises an optically transparent substrate with the tag on a laser-incident surface of the substrate.

25. The method of claim 21, wherein the media article comprises an optically transparent substrate with the tag on a data layer adjacent to a reflective layer.

26. The method of claim 21, wherein the predetermined locations on the surface of the article are modified using chemical modification.

* * * * *